United States Patent
Jung

(10) Patent No.: US 11,989,547 B2
(45) Date of Patent: May 21, 2024

(54) APPARATUS FOR OPERATING OTA UPDATE FOR VEHICLE, AND METHOD THEREOF

(71) Applicants: Hyundai Motor Company, Seoul (KR); Kia Corporation, Seoul (KR)

(72) Inventor: Jae Won Jung, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 65 days.

(21) Appl. No.: 17/825,762

(22) Filed: May 26, 2022

(65) Prior Publication Data
US 2023/0056870 A1   Feb. 23, 2023

(30) Foreign Application Priority Data
Aug. 17, 2021 (KR) .................. 10-2021-0108246

(51) Int. Cl.
*G06F 8/65* (2018.01)
*B60L 58/12* (2019.01)

(52) U.S. Cl.
CPC ............. *G06F 8/65* (2013.01); *B60L 58/12* (2019.02)

(58) Field of Classification Search
CPC ...... H04L 67/34; H04L 2209/84; B60L 58/12; G06F 8/65; G06F 16/23; G06F 21/305; G06F 8/61
See application file for complete search history.

(56) References Cited

U.S. PATENT DOCUMENTS

| | | | |
|---|---|---|---|
| 9,715,378 B2* | 7/2017 | Dickerson | G06F 8/65 |
| 2013/0132939 A1* | 5/2013 | Murata | G06F 8/65 |
| | | | 717/173 |
| 2018/0018160 A1* | 1/2018 | Teraoka | G06F 8/65 |
| 2018/0203683 A1* | 7/2018 | Kim | G06F 8/65 |
| 2020/0192655 A1* | 6/2020 | Jeong | G06F 8/65 |
| 2021/0188243 A1* | 6/2021 | Morii | G06F 8/65 |
| 2021/0389940 A1* | 12/2021 | Iwata | B60L 53/665 |
| 2021/0403016 A1* | 12/2021 | Jung | B60W 50/06 |

* cited by examiner

*Primary Examiner* — S. Sough
*Assistant Examiner* — Cheneca Smith
(74) *Attorney, Agent, or Firm* — MORGAN, LEWIS & BOCKIUS LLP

(57) ABSTRACT

An apparatus of operating an OTA update for a vehicle includes an input device receiving approval information for approving an OTA update process of a vehicle from a user and an execution device executing one of a first process or a second process in response to the approval information being entered. Each of the first process and the second process includes at least one of a battery charging process of a battery in the vehicle or the OTA update process of the vehicle.

16 Claims, 5 Drawing Sheets

APPARATUS FOR OPERATING OTA UPDATE FOR VEHICLE, AND METHOD THEREOF

CROSS-REFERENCE TO RELATED APPLICATION

The present application claims priority to Korean Patent Application No. 10-2021-0108246, filed on Aug. 17, 2021, the entire contents of which is incorporated herein for all purposes by this reference.

BACKGROUND OF THE INVENTION

Field of the Invention

The present invention relates to an apparatus and method for operating an OTA update for a vehicle.

Description of Related Art

A general electric vehicle may be driven based on a battery included in a vehicle. The battery may include a high-voltage battery and/or a low-voltage battery. However, when the vehicle's high-voltage battery is being charged (e.g., when a high-voltage battery charger connector is connected to the vehicle), it is impossible to operate an OTA update due to instability of controller area network (CAN) communication between controllers included in the vehicle.

Furthermore, although the vehicle's battery is not charged, when the OTA update is performed in a state where the vehicle's battery is not sufficiently charged, the ongoing OTA update may not be completed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus or method for properly setting a process of battery charging and OTA update when a request for operating an OTA update is received from a user (or a driver) while a battery is being charged.

Moreover, various aspects of the present invention are directed to providing an apparatus or method for properly setting a process of battery charging and OTA update in consideration of a time required until the battery charging is started, when a request for operating an OTA update is received from a user (or a driver) while a battery is being charged.

The technical problems to be solved by the present invention are not limited to the aforementioned problems, and any other technical problems not mentioned herein will be clearly understood from the following description by those skilled in the art to which various exemplary embodiments of the present invention pertains.

According to various aspects of the present invention, an apparatus of operating an OTA update may include an input device receiving approval information for approving an OTA update process of a vehicle from a user and an execution device executing one of a first process or a second process in response to the approval information being entered. Each of the first process and the second process may include at least one of a battery charging process of a battery in the vehicle or the OTA update process of the vehicle.

Furthermore, according to various exemplary embodiments of the present invention, the battery may correspond to a high-voltage battery.

Moreover, according to various exemplary embodiments of the present invention, the approval information may include first approval information for approving the OTA update process and second approval information for approving the OTA update process and the battery charging process.

Also, according to various exemplary embodiments of the present invention, the second approval information is entered in response to the first approval information being entered.

Besides, according to various exemplary embodiments of the present invention, the battery charging process may be performed based on a first power supply included in the vehicle. The OTA update process may be performed based on a second power supply included in the vehicle. The second power supply may correspond to a power supply which is constantly on.

Furthermore, according to various exemplary embodiments of the present invention, the first process may turn off the first power supply and may perform the OTA update process, in response to the battery charging process being completed.

Furthermore, according to various exemplary embodiments of the present invention, the second process may be performed based on a first time, which is required to perform the OTA update process, and a second time entered from the user.

Moreover, according to various exemplary embodiments of the present invention, the second process may perform the battery charging process in response to the OTA update process being completed, when the first time is less than or equal to the second time. The OTA update process may be performed in a state where the first power supply is off.

Also, according to various exemplary embodiments of the present invention, the second process may turn off the first power supply and may perform the OTA update process in response to the battery charging process being completed, when the first time is longer than the second time.

Besides, according to various exemplary embodiments of the present invention, the OTA update process may be performed in a state where an update condition is satisfied. The update condition may include at least one of a condition that a state-of-charge (SOC) value of the battery is greater than a preset SOC value, a condition that a speed of the vehicle is 0, a condition that the first power supply is on, or a condition that the second power supply is off.

According to various aspects of the present invention, a method for operating an OTA update may include receiving approval information for approving an OTA update process of a vehicle from a user and executing one of a first process or a second process in response to the approval information being entered. Each of the first process and the second process includes at least one of a battery charging process of a battery in the vehicle or the OTA update process of the vehicle.

Furthermore, according to various exemplary embodiments of the present invention, the battery may correspond to a high-voltage battery.

Moreover, according to various exemplary embodiments of the present invention, the approval information may include first approval information for approving the OTA update process and second approval information for approving the OTA update process and the battery charging process.

Also, according to various exemplary embodiments of the present invention, the second approval information is entered in response to the first approval information being entered.

Besides, according to various exemplary embodiments of the present invention, the battery charging process may be performed based on a first power supply included in the vehicle. The OTA update process may be performed based on a second power supply included in the vehicle. The second power supply may correspond to a power supply which is constantly on.

Furthermore, according to various exemplary embodiments of the present invention, the first process may turn off the first power supply and may perform the OTA update process, in response to the battery charging process being completed.

Furthermore, according to various exemplary embodiments of the present invention, the second process may be performed based on a first time, which is required to perform the OTA update process, and a second time entered from the user.

Moreover, according to various exemplary embodiments of the present invention, the second process may perform the battery charging process in response to the OTA update process being completed, when the first time is less than or equal to the second time. The OTA update process may be performed in a state where the first power supply is off.

Also, according to various exemplary embodiments of the present invention, the second process may turn off the first power supply and may perform the OTA update process in response to the battery charging process being completed, when the first time is longer than the second time.

Besides, according to various exemplary embodiments of the present invention, the OTA update process may be performed in a state where an update condition is satisfied. The update condition may include at least one of a condition that an SOC value of a battery is greater than a preset SOC value, a condition that a speed of the vehicle is 0, a condition that the first power supply is on, or a condition that the second power supply is off.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
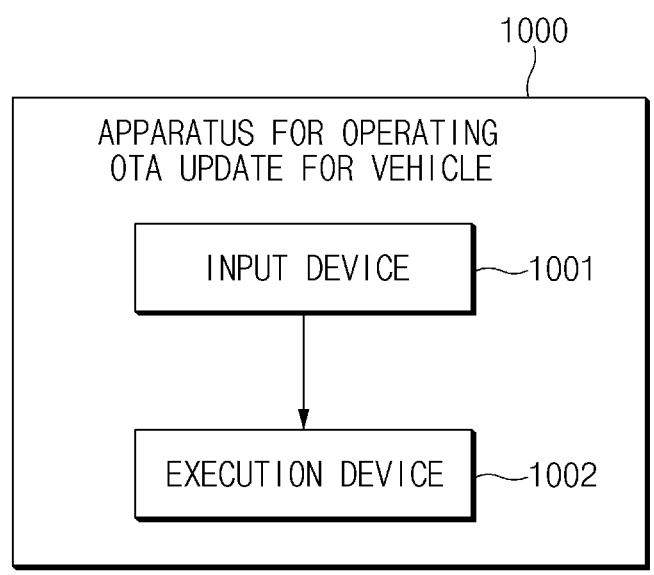
FIG. 1 illustrates an example of an apparatus of operating an OTA update for a vehicle, according to various exemplary embodiments.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In adding reference numerals to components of each drawing, it should be noted that the same components have the same reference numerals, although they are indicated on another drawing. In describing the exemplary embodiments of the present invention, detailed descriptions associated with well-known functions or configurations will be omitted when they may make subject matters of the present invention unnecessarily obscure.

In describing components of embodiments of the present invention, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which various exemplary embodiments of the present invention belongs. It will be understood that terms used herein should be interpreted as having a meaning which is consistent with their meaning in the context of the present invention and the relevant art and will not be interpreted in an idealized or overly formal sense unless expressly so defined herein.

Hereinafter, various embodiments of the present invention will be described in detail with reference to FIG. 1, FIG. 2, FIG. 3, FIG. 4, and FIG. 5.

FIG. 1 illustrates an example of an apparatus of operating an OTA update for a vehicle, according to various exemplary embodiments.

This drawing illustrates an example of an apparatus 1000 (or a device) for operating an OTA update for a vehicle, according to various exemplary embodiments.

A vehicle according to various exemplary embodiments may include at least one of an electric vehicle (EV), a hybrid electric vehicle (HEV), or a plug-in hybrid electric vehicle (PHEV).

An over-the-air (OTA) update according to various exemplary embodiments may indicate a method for updating software of a vehicle over a wireless communication network. In general, software of a vehicle is executed by connecting a storage device, in which data for updating the software is stored, to the vehicle by wire. However, thanks to the development of communication technology, the vehicle may directly receive data required to update software over a wireless communication network and then may perform an update.

A general electric vehicle may be driven based on a battery included in a vehicle. The battery may include a high-voltage battery and/or a low-voltage battery. However, when the vehicle's high-voltage battery is being charged (e.g., when a high-voltage battery charger connector is connected to the vehicle), it is impossible to operate an OTA update due to instability of controller area network (CAN) communication between controllers included in the vehicle.

Furthermore, although the vehicle's battery is not charged, when the OTA update is performed in a state where the vehicle's battery is not sufficiently charged, the ongoing OTA update may not be completed.

An apparatus according to various exemplary embodiments may solve the above-described problems. Problems solved by the apparatus according to various exemplary embodiments are not limited to the above-described examples.

The apparatus may properly set a process of battery charging and OTA update when a request for operating an OTA update is received from a user (or a driver) of a vehicle while a battery is being charged. Moreover, an apparatus may properly set a process of battery charging and OTA update in consideration of a time required until the battery charging is started, when a request for operating an OTA update is received from a user of a vehicle while a battery is being charged.

An apparatus of operating an OTA update for a vehicle according to various exemplary embodiments may include an input device 1001 and/or an execution device 1002. The apparatus according to various exemplary embodiments may further include one or more elements not shown in FIG. 1. The apparatus according to various exemplary embodiments may be located inside or outside a vehicle.

The input device 1001 according to various exemplary embodiments may receive approval information for approving an OTA update process of a vehicle from a user. The user may be a user (or driver) of the vehicle. The OTA update process of the vehicle may indicate a process of operating the above-described OTA update.

The approval information according to various exemplary embodiments may be information that causes an apparatus (or a vehicle) to charge the vehicle's battery and/or to operate an OTA update of the vehicle. The approval information may include first approval information for approving an OTA update process and/or second approval information for approving the OTA update process and a battery charging process. The above-described first approval information and/or second approval information may be individually or simultaneously entered from the user.

The execution device 1002 according to various exemplary embodiments may perform one of the first process or the second process in response to the approval information being entered. Each of the first process and the second process according to various exemplary embodiments may include at least one of the battery charging process of a vehicle or the OTA update process of a vehicle. The description of the OTA update process is the same as that described above. The battery charging process may indicate a process of charging a battery of a vehicle.

That is, as described above, the first process and the second process may include both a battery charging process and an OTA update process. However, orders including each process may be different from one another. For example, the first process refers to a process in which the OTA update process is performed in response to the battery charging process being completed. Also, for example, the second process is a process in which the battery charging process is performed in response to the OTA update process being completed.

For example, like reserved charging, even when a battery needs to be charged at a time reserved by the user, the battery charging process may need to be performed later than the OTA update process. However, even in the instant case, when the OTA update process is capable of being completed before the time reserved by the user, the OTA update process may be performed first.

Through the method described in the present drawing, the apparatus according to various exemplary embodiments may perform the battery charging process and the OTA update process by appropriately changing the order of the battery charging process and the OTA update process. In detail, even when the user reserves the charging of the battery, the order of the battery charging process and the OTA update process may be appropriately changed in consideration of the reserved battery charging time, performing efficient and safe OTA update and vehicle battery charging.

Figure 2:
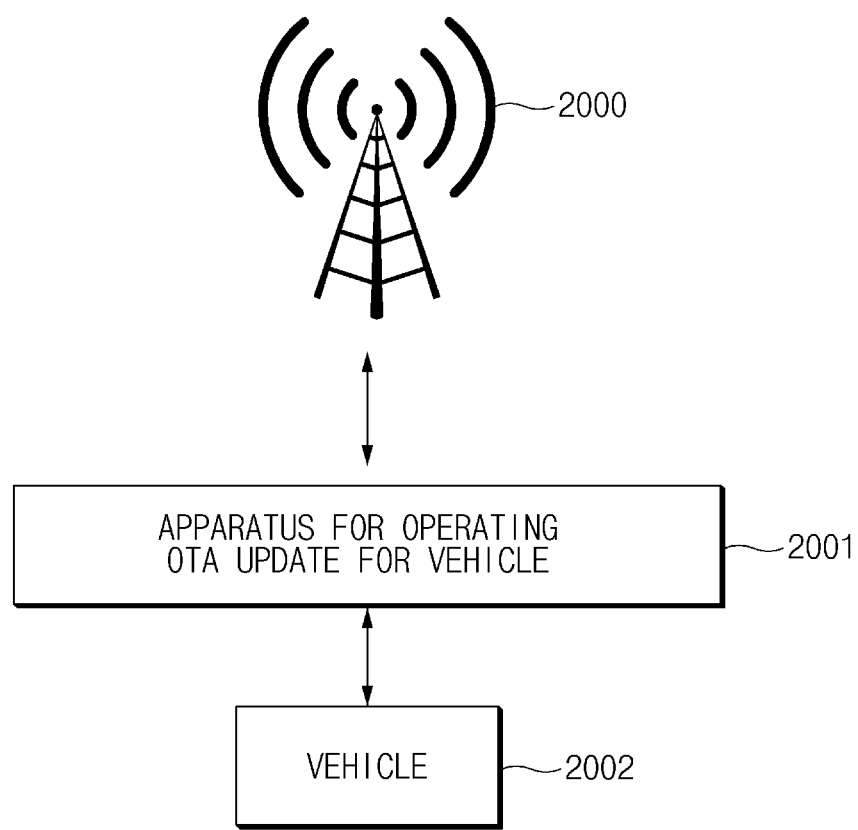
FIG. 2 illustrates an example of an environment, in which an apparatus of operating an OTA update for a vehicle is operated, according to various exemplary embodiments.

FIG. 2 illustrates an example of an environment, in which an apparatus of operating an OTA update for a vehicle is operated, according to various exemplary embodiments.

This drawing illustrates an example of an environment, in which an apparatus 2001 (the apparatus described above in FIG. 1) for operating an OTA update for a vehicle according to various exemplary embodiments is operated.

The apparatus 2001 according to various exemplary embodiments may transmit/receive information related to an OTA update with the server 2000 and/or the vehicle 2002.

The server 2000 according to various exemplary embodiments may transmit information (e.g., information related to a software update, information related to a software version, or the like) about an OTA update to the above-described apparatus. For example, the apparatus may receive information related to an OTA update in response to receiving the above-described approval information.

The apparatus 2001 according to various exemplary embodiments may update software of the vehicle based on the received OTA update information. For example, the apparatus updates software of controller(s) included in the vehicle based on the received OTA update information. As described above with reference to FIG. 1, the apparatus according to various exemplary embodiments may be located inside or outside a vehicle.

Through the method described in the present drawing, the apparatus according to various exemplary embodiments may perform the battery charging process and the OTA update process by appropriately changing the order of the battery charging process and the OTA update process. In detail, even when the user reserves the charging of the battery, the order of the battery charging process and the OTA update process may be appropriately changed in consideration of the reserved battery charging time, performing efficient and safe OTA update and vehicle battery charging.

Figure 3:
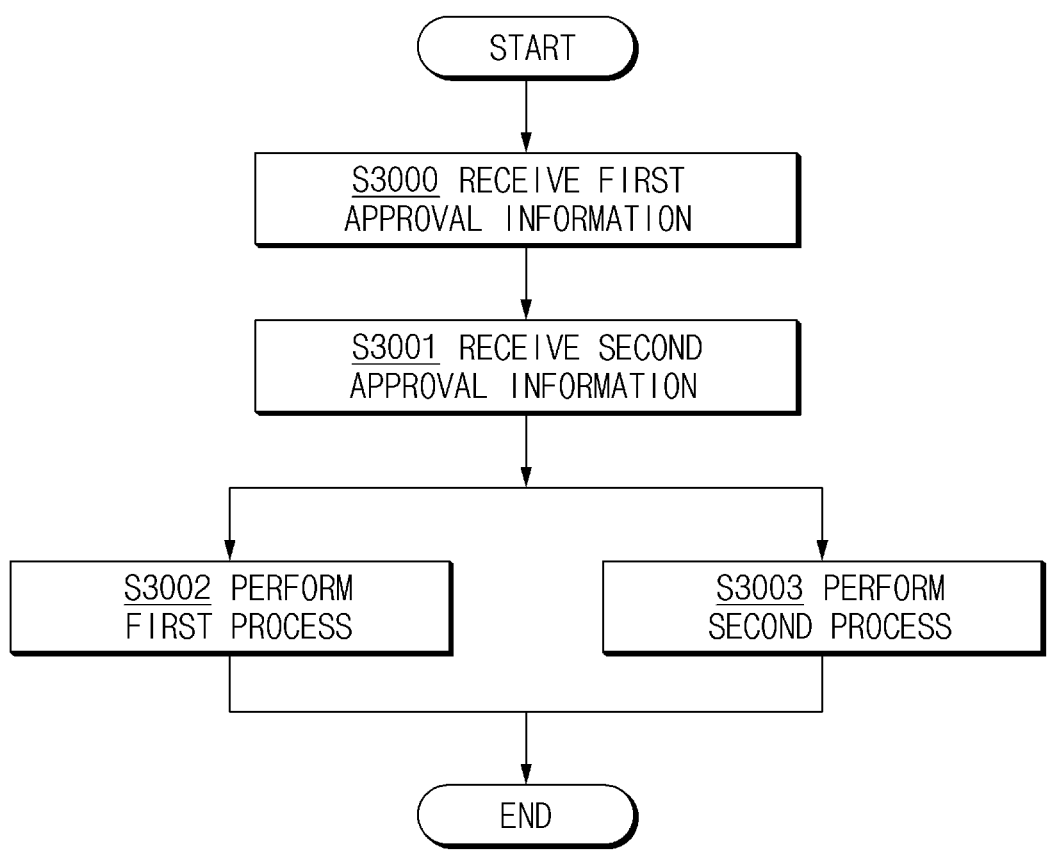
FIG. 3 illustrates an example of a process of operating an OTA update for a vehicle, according to various exemplary embodiments.

FIG. 3 illustrates an example of a process of operating an OTA update for a vehicle, according to various exemplary embodiments.

This drawing is a flowchart illustrating an example of a process of operating an OTA update for a vehicle (the OTA update described above in FIGS. 1 to 2) according to various exemplary embodiments.

The apparatus described above in FIG. 1 and FIG. 2 may perform the method described in the present drawing.

The input device according to various exemplary embodiments may receive first approval information (S3000). The description of the first approval information is the same as or similar to that described above with reference to FIG. 1.

The input device according to various exemplary embodiments may receive second approval information in response to the first approval information being entered (S3001). The description of the second approval information is the same as or similar to that described above with reference to FIG. 1. That is, the second approval information may be entered in response to the first approval information being entered.

As described above in FIGS. 1 to 2, the apparatus may perform an OTA update process and/or a battery charging process in response to the first approval information and the second approval information being entered. A detailed description of the OTA update process and the battery charging process is the same as or similar to that described above with reference to FIG. 1.

As described above in FIG. 1, the above-described OTA update process and/or battery charging process may be performed based on a first process and/or a second process. A detailed description of the first process and the second process is the same as or similar to that described above with reference to FIG. 1.

As described above in FIG. 1, the execution device included in the apparatus may perform one of the first process or the second process.

As described above in FIG. 1, the first process may be a process in which the OTA update process is operated in response to the battery charging process being completed. Furthermore, the second process may be a process in which the battery charging process is performed in response to the OTA update process being completed. That is, the second process may be a process that performs the battery charging process later, as compared to the first process.

The execution device according to various exemplary embodiments may perform the first process (S3002). For example, the apparatus performs the first process in response to a user entering the second approval information.

The execution device according to various exemplary embodiments may perform the second process (S3003). For example, the apparatus performs the second process in response to the user entering the second approval information and information indicating the reserved charging of a battery. The above-described information indicating the reserved charging of the battery may include specific time information. The specific time information may be information indicating a time difference between a current time and a time when the reserved charging of the battery is started.

A detailed description of the first process and the second process according to various exemplary embodiments will be described later with reference to FIG. 4.

Through the method described in the present drawing, the apparatus according to various exemplary embodiments may perform the battery charging process and the OTA update process by appropriately changing the order of the battery charging process and the OTA update process. In detail, even when the user reserves the charging of the battery, the order of the battery charging process and the OTA update process may be appropriately changed in consideration of the reserved battery charging time, performing efficient and safe OTA update and vehicle battery charging.

Figure 4:
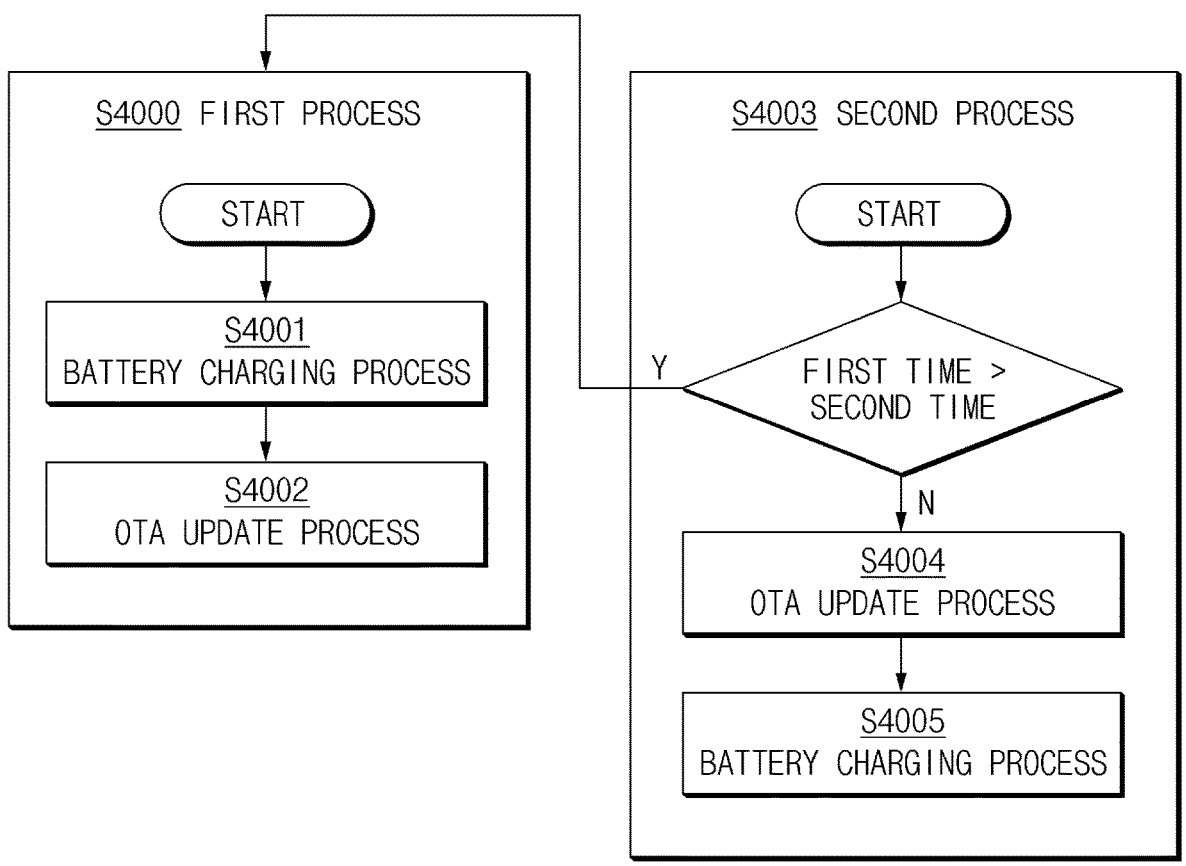
FIG. 4 illustrates an example of a first process and a second process, according to various exemplary embodiments.

FIG. 4 illustrates an example of a first process and a second process, according to various exemplary embodiments.

This drawing is a flowchart illustrating an example of a first process and a second process (the first process and the second process described above in FIGS. 1 and 3) according to various exemplary embodiments.

As described above with reference to FIGS. 1 and 3, each of the first process and the second process according to various exemplary embodiments may include at least one of the battery charging process of a vehicle or the OTA update process of the vehicle.

A vehicle according to various exemplary embodiments may include one or more power supplies. The battery charging process according to various exemplary embodiments may be performed based on a first power supply included in the vehicle. The OTA update process according to various exemplary embodiments is performed based on a second power supply included in the vehicle. The second power supply may correspond to a power supply which is constantly on. For example, the first power supply corresponds to an ignition (IGN) power supply of the vehicle, and the second power supply corresponds to the B+ power supply (constant power supply).

While the OTA update process is performed in a state where the first power supply according to the exemplary embodiment is on, a communication instability problem between the controllers described above with reference to FIG. 1 may occur. Accordingly, the apparatus may turn off the first power supply of the vehicle while the OTA update process is being performed.

As described above with reference to FIGS. 1 and 3, a first process 54000 may include a battery charging process 54001 and an OTA update process 54002.

The first process according to various exemplary embodiments may turn off the first power supply and may perform the OTA update process in response to the battery charging process being completed. That is, to solve the above-described problem, the OTA update process included in the first process may be performed in a state where the first power supply of the vehicle is turned off. However, in the instant case, the second power supply may be turned on.

As described above with reference to FIGS. 1 and 3, a second process 54003 may include an OTA update process 54004 and a battery charging process 54005.

As described above with reference to FIG. 3, the battery charging process included in the second process may be a charging process (e.g., a reserved charging process) set to be performed after a specific time from the current time. The specific time described above may be referred to as a second time. That is, the battery charging process included in the second process may be performed after the second time from the current time.

The OTA update process included in the second process according to various exemplary embodiments may be performed during the first time. That is, the first time according to various exemplary embodiments may be a time required until the above-described OTA update process is completed.

The execution device according to various exemplary embodiments may change the order of the battery charging process and the OTA update process by comparing the above-described first time and second time. For example, when the apparatus is configured for completing the OTA update process before the battery charging process is started, the apparatus performs the OTA update process first.

That is, the second process may be performed based on the first time, which is required to perform the OTA update process, and the second time entered from a user.

For example, when the first time is longer than the second time, the second process may perform a process identical or similar to the first process. In other words, when the first time is longer than the second time, the second process may turn off the first power supply and may perform an OTA update process in response to the battery charging process being completed.

For example, when the first time is less than or equal to the second time, the second process may perform the battery charging process in response to the OTA update process being completed. As described above, the OTA update process may be performed in a state where the first power supply is turned off.

That is, through the method described above, for the battery reservation charging, the apparatus may appropriately determine the order of the OTA update process and the battery charging process in consideration of a time when the reserved battery charging is started.

The OTA update process according to various exemplary embodiments may be performed in a state where an update condition is satisfied. The update condition may indicate the minimum condition that allows the vehicle to perform the OTA update process. The update condition may include at least one of a condition that a state-of-charge (SOC) value of the battery is greater than a preset SOC value, a condition that a vehicle speed is 0, a condition that the first power supply is on, or a condition that the second power supply is off.

Through the method described in the present drawing, the apparatus according to various exemplary embodiments may perform the battery charging process and the OTA update process by appropriately changing the order of the battery charging process and the OTA update process. In detail, even when the user reserves the charging of the battery, the order of the battery charging process and the OTA update process may be appropriately changed in consideration of the reserved battery charging time, performing efficient and safe OTA update and vehicle battery charging.

Figure 5:
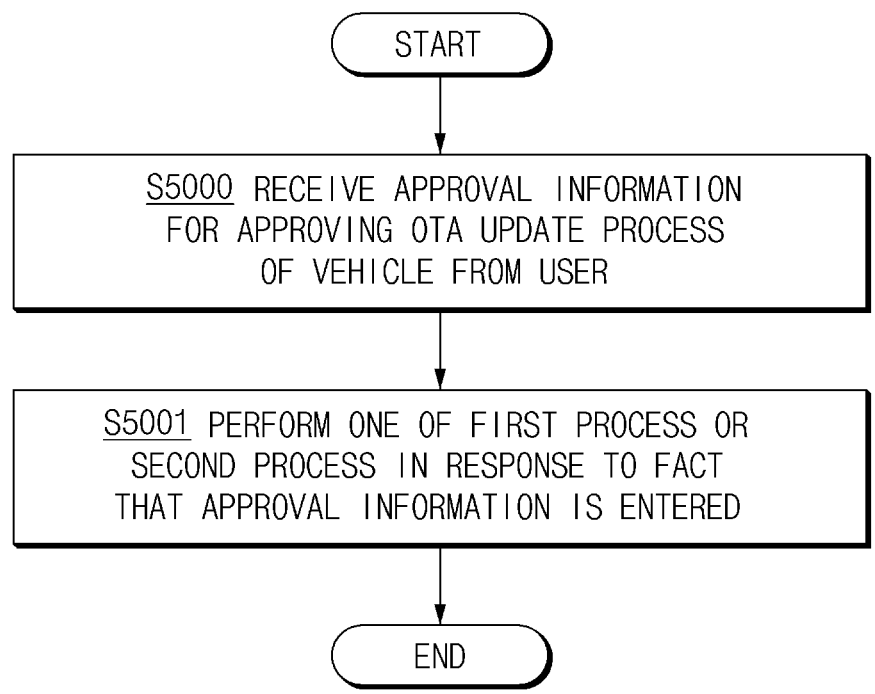
FIG. 5 illustrates an example of a method for operating an OTA update for a vehicle, according to various exemplary embodiments.

FIG. 5 illustrates an example of a method for operating an OTA update for a vehicle, according to various exemplary embodiments.

This drawing is a flowchart illustrating an example of a method (or a procedure) for operating an OTA update for a vehicle according to various exemplary embodiments.

The apparatus described above in FIG. 1, FIG. 2, FIG. 3, and FIG. 4 may perform the method described in the present drawing.

The method according to various exemplary embodiments may include step S5000 of receiving approval information for approving an OTA update process of a vehicle from a user and/or step S5001 of performing one of a first process or a second process in response to the approval information being entered. A method according to various exemplary embodiments may further include one or more steps not shown in FIG. 5.

Each of the first process and the second process according to various exemplary embodiments may include at least one of the battery charging process of a vehicle or the OTA update process of a vehicle. According to various exemplary embodiments of the present invention, a detailed description of the first process and the second process is the same as or similar to those described above with reference to FIG. 1, FIG. 2, FIG. 3, and FIG. 4.

The battery according to various exemplary embodiments may correspond to a high-voltage battery. The description of the battery and the high-voltage battery is the same as or similar to those described above with reference to FIG. 1.

According to various exemplary embodiments of the present invention, the approval information may include first approval information for approving an OTA update process and second approval information for approving the OTA update process and a battery charging process. According to various exemplary embodiments of the present invention, the second approval information may be entered in response to the first approval information being entered. According to various exemplary embodiments of the present invention, the detailed description of the first approval information and the second approval information is the same as or similar to those described above in FIG. 1, FIG. 2, FIG. 3, and FIG. 4.

The battery charging process according to various exemplary embodiments may be performed based on a first power supply included in the vehicle. The OTA update process according to various exemplary embodiments is performed based on a second power supply included in the vehicle. The second power supply may correspond to a power supply which is constantly on. A detailed description of the first power supply and the second power supply is the same as or similar to that described above with reference to FIG. 4.

The first process according to various exemplary embodiments may turn off the first power supply and may perform the OTA update process in response to the battery charging process being completed.

According to various exemplary embodiments of the present invention, the second process may be performed based on the first time, which is required to perform the OTA update process, and the second time entered from a user.

According to various exemplary embodiments of the present invention, when the first time is less than or equal to the second time, the second process may perform the battery charging process in response to the OTA update process being completed. According to various exemplary embodiments of the present invention, the OTA update process may be performed in a state where the first power supply is turned off.

According to various exemplary embodiments of the present invention, when the first time is longer than the second time, the second process may turn off the first power supply and may perform an OTA update process in response to the battery charging process being completed.

According to various exemplary embodiments of the present invention, a detailed description of the first process and the second process is the same as or similar to those described above with reference to FIG. 1, FIG. 2, FIG. 3, and FIG. 4.

The OTA update process according to various exemplary embodiments may be performed in a state where an update condition is satisfied. The update condition may include at least one of a condition that an SOC value of the battery is greater than a preset SOC value, a condition that a vehicle speed is 0, a condition that the first power supply is on, or a condition that the second power supply is off. The detailed description of an update condition is the same as or similar to that described above in FIG. 4.

The above description is merely an example of the technical idea of the present invention, and various modifications and modifications may be made by one skilled in the art without departing from the essential characteristic of the present invention.

Accordingly, embodiments of the present invention are intended not to limit but to explain the technical idea of the present invention, and the scope and spirit of the present invention is not limited by the above embodiments. The scope of protection of the present invention should be construed by the attached claims, and all equivalents thereof should be construed as being included within the scope of the present invention.

According to various exemplary embodiments of the present invention, it is possible to properly set a process of battery charging and OTA update when a request for operating an OTA update is received from a user (or a driver) of a vehicle while a battery is being charged.

Furthermore, according to various exemplary embodiments of the present invention, it is possible to properly set a process of battery charging and OTA update in consideration of a time required until the battery charging is started, when a request for operating an OTA update is received from a user of a vehicle while a battery is being charged.

In an exemplary embodiment of the present invention, the execution device 1002 of the apparatus for operating OTA update for vehicle 1000 may include a controller.

In addition, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Besides, a variety of effects directly or indirectly understood through the specification may be provided.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for operating an over-the-air (OTA) update, the method comprising:
   receiving approval information for approving an OTA update process of a vehicle from a user; and
   executing, by an execution device, one of a first process or a second process in response to the approval information being entered,
   wherein each of the first process and the second process includes at least one of a battery charging process of a battery in the vehicle or the OTA update process of the vehicle,
   wherein the battery charging process is performed based on a first power supply included in the vehicle,
   wherein the OTA update process is performed based on a second power supply included in the vehicle,
   wherein the second power supply corresponds to a power supply which is constantly on, and
   wherein in the first process, the execution device is configured to turn off the first power supply and to perform the OTA update process, in response to the battery charging process being completed.

2. The method of claim 1, wherein the battery corresponds to a high-voltage battery.

3. The method of claim 1, wherein the approval information includes first approval information for approving the OTA update process and second approval information for approving the OTA update process and the battery charging process.

4. The method of claim 3, wherein the second approval information is entered in response to the first approval information being entered.

5. The method of claim 1, wherein the second process is performed based on a first time, which is required to perform the OTA update process, and a second time entered from the user.

6. The method of claim 5,
wherein in the second process, the execution device is configured to perform the battery charging process in response to the OTA update process being completed, when the first time is less than or equal to the second time, and
wherein the OTA update process is performed in a state where the first power supply is off.

7. The method of claim 5, wherein in the second process, the execution device is configured to turn off the first power supply and to perform the OTA update process in response to the battery charging process being completed, when the first time is longer than the second time.

8. The method of claim 1, wherein the OTA update process is performed in a state where an update condition is satisfied, and wherein the update condition includes at least one of a condition that a state-of-charge (SOC) value of the battery is greater than a preset SOC value, a condition that a speed of the vehicle is 0, a condition that the first power supply is on, or a condition that the second power supply is off.

9. An apparatus for operating an over-the-air (OTA) update, the apparatus comprising:
an input device configured to receive approval information for approving an OTA update process of a vehicle from a user; and
an execution device configured to execute one of a first process or a second process in response to the approval information being entered,
wherein each of the first process and the second process includes at least one of a battery charging process of a battery in the vehicle or the OTA update process of the vehicle,
wherein the battery charging process is performed based on a first power supply included in the vehicle,
wherein the OTA update process is performed based on a second power supply included in the vehicle,
wherein the second power supply corresponds to a power supply which is constantly on, and
wherein in the first process, the execution device is configured to turn off the first power supply and to perform the OTA update process, in response to the battery charging process being completed.

10. The apparatus of claim 9, wherein the battery corresponds to a high-voltage battery.

11. The apparatus of claim 9, wherein the approval information includes first approval information for approving the OTA update process and second approval information for approving the OTA update process and the battery charging process.

12. The apparatus of claim 11, wherein the second approval information is entered in response to the first approval information being entered.

13. The apparatus of claim 9, wherein the second process is performed based on a first time, which is required to perform the OTA update process, and a second time entered from the user.

14. The apparatus of claim 13,
wherein in the second process, the execution device is configured to perform the battery charging process in response to the OTA update process being completed, when the first time is less than or equal to the second time, and
wherein the OTA update process is performed in a state where the first power supply is off.

15. The apparatus of claim 13, wherein in the second process, the execution device is configured to turn off the first power supply and to perform the OTA update process in response to the battery charging process being completed, when the first time is longer than the second time.

16. The apparatus of claim 9,
wherein the OTA update process is performed in a state where an update condition is satisfied, and
wherein the update condition includes at least one of a condition that a state-of-charge (SOC) value of the battery is greater than a preset SOC value, a condition that a speed of the vehicle is 0, a condition that the first power supply is on, or a condition that the second power supply is off.

* * * * *